No. 718,766. PATENTED JAN. 20, 1903.
T. D. INGRAM.
MASSAGE MACHINE.
APPLICATION FILED OCT. 14, 1902.
NO MODEL. 4 SHEETS—SHEET 1.
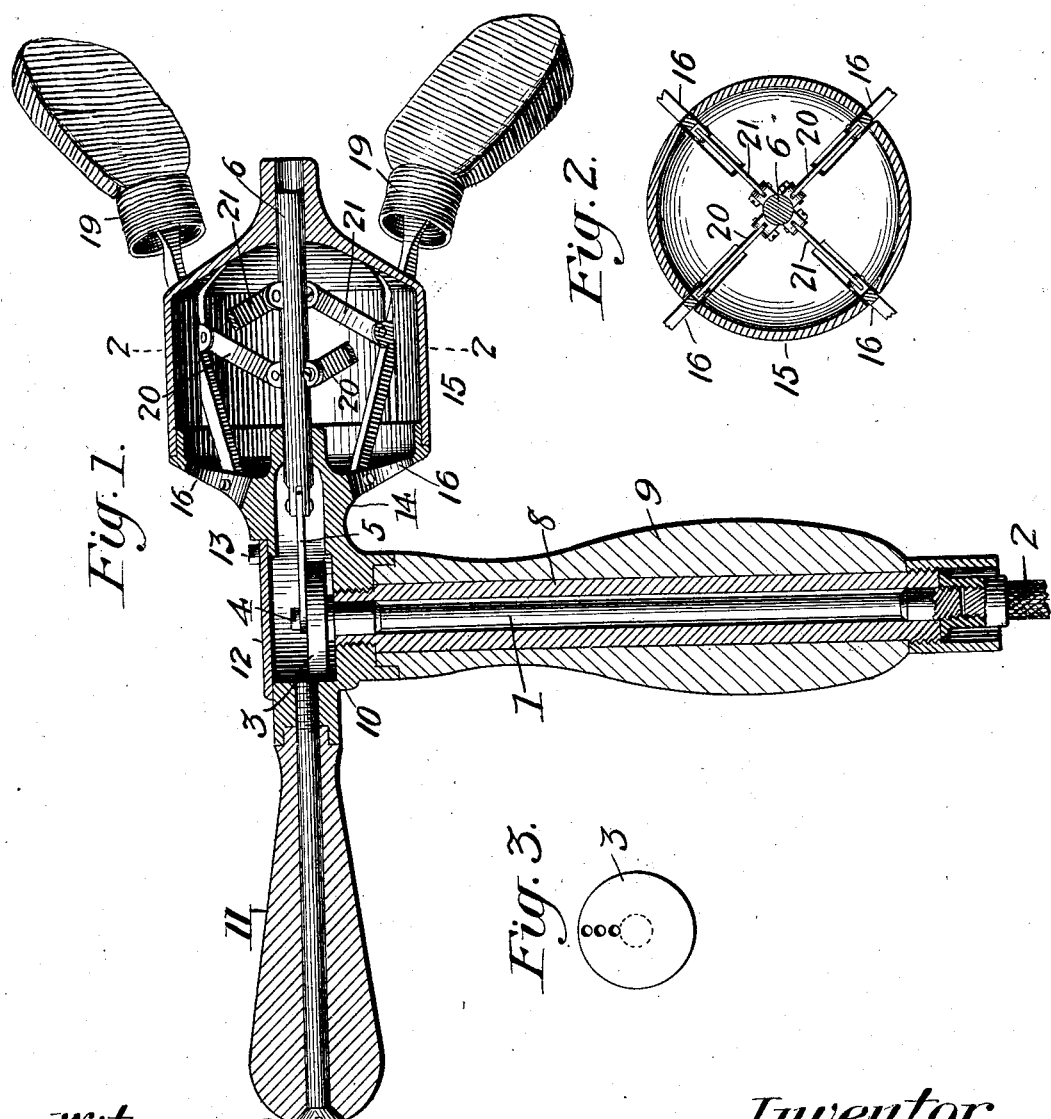
Witnesses:
Chas. J. O'Neill
J. E. Hutchinson Jr.
Inventor:
Thomas D. Ingram,
by Rennie & Goldsborough,
Attys.

No. 718,766. PATENTED JAN. 20, 1903.
T. D. INGRAM.
MASSAGE MACHINE.
APPLICATION FILED OCT. 14, 1902.
NO MODEL. 4 SHEETS—SHEET 2.
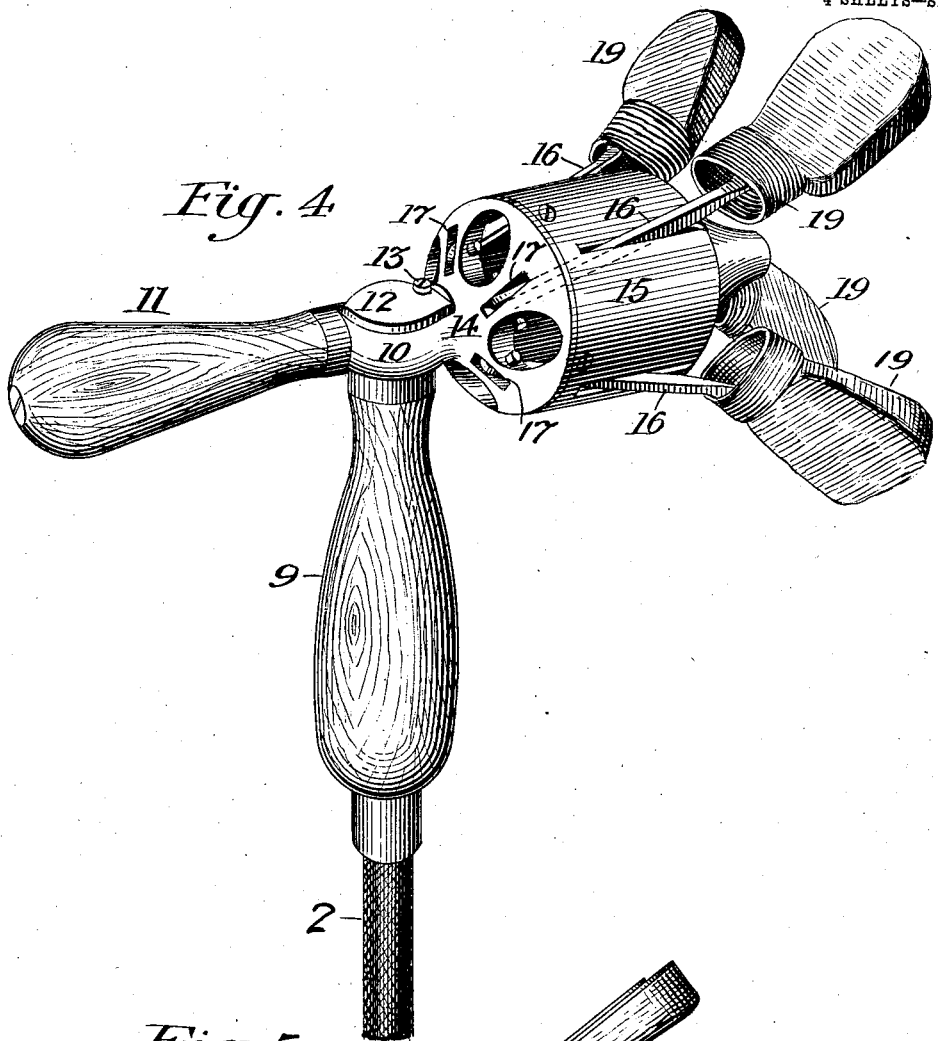
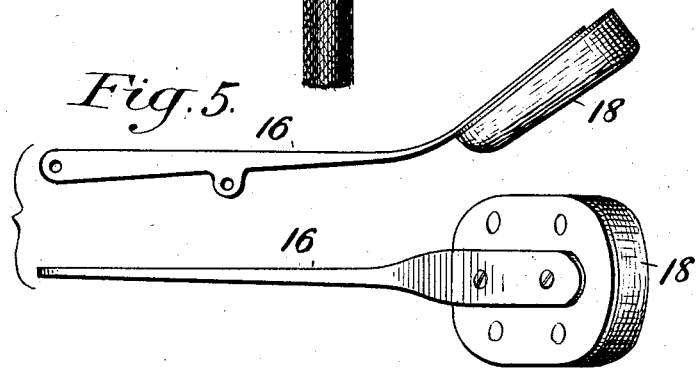
Witnesses: Inventor:

No. 718,766. PATENTED JAN. 20, 1903.
T. D. INGRAM.
MASSAGE MACHINE.
APPLICATION FILED OCT. 14, 1902.
NO MODEL. 4 SHEETS—SHEET 3.
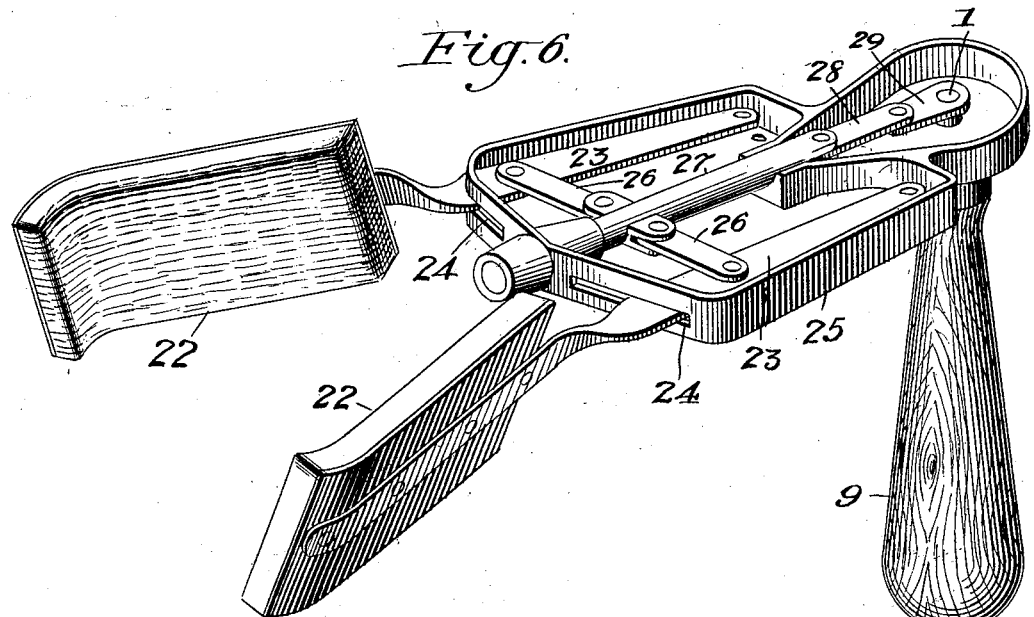
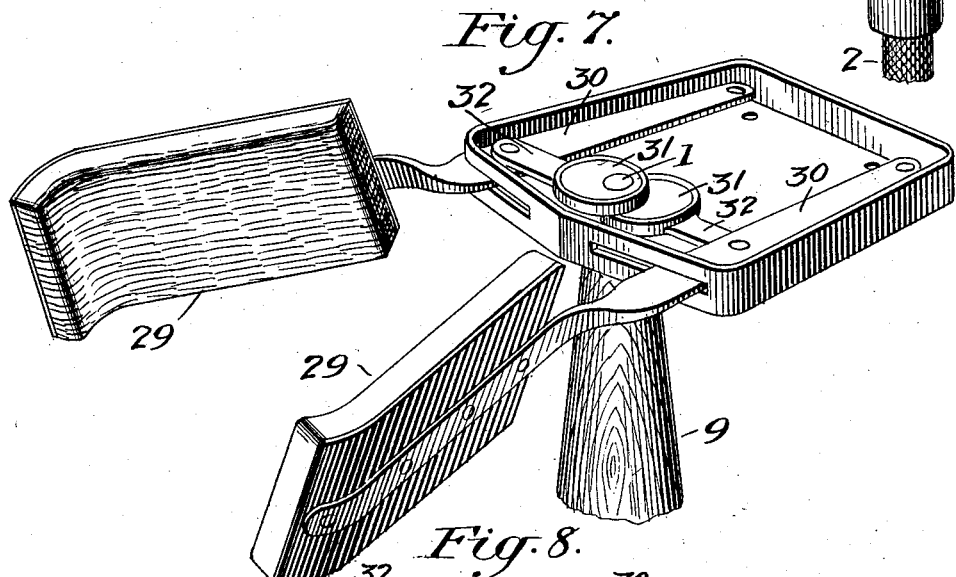
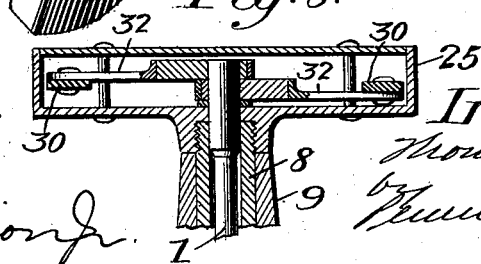
Witnesses: Inventor:

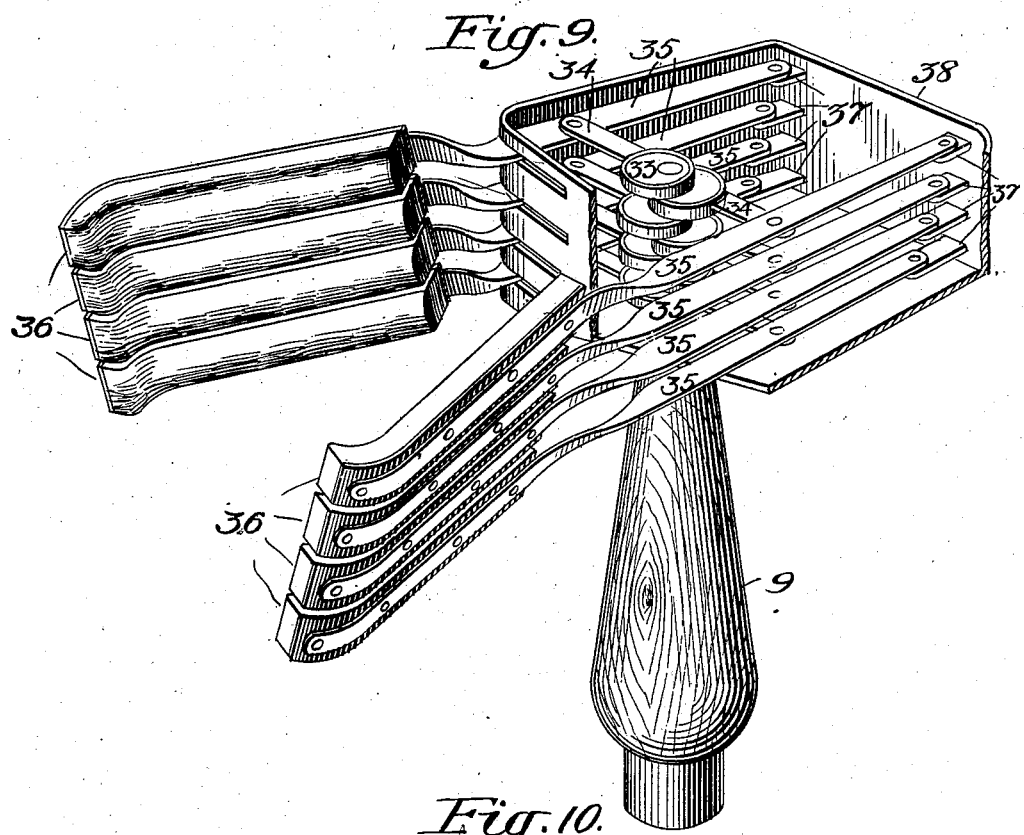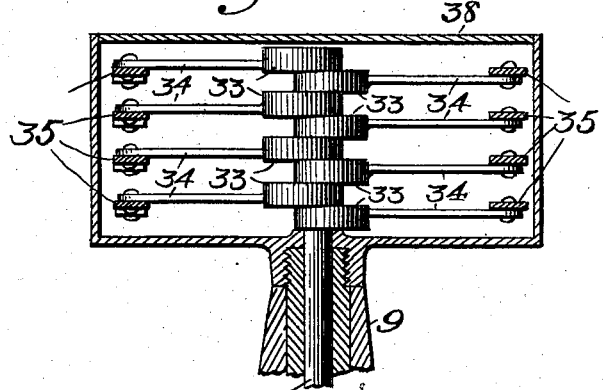

UNITED STATES PATENT OFFICE.

THOMAS D. INGRAM, OF WASHINGTON, DISTRICT OF COLUMBIA.

MASSAGE-MACHINE.

SPECIFICATION forming part of Letters Patent No. 718,766, dated January 20, 1903.

Application filed October 14, 1902. Serial No. 127,307. (No model.)

*To all whom it may concern:*

Be it known that I, THOMAS D. INGRAM, a citizen of the United States, residing at Washington, District of Columbia, have invented certain new and useful Improvements in Massage-Machines; and I do hereby declare the following to be a full, clear, and exact description of the invention, such as will enable others skilled in the art to which it appertains to make and use the same.

My invention relates, primarily, to a machine to be used for giving mechanical massage, and, in effect, is designed to act in close imitation of the manner of giving massage by the human hands. It has for its object the manipulation of the muscles and other soft tissues of the human body in a manner that will press onward toward the heart the circulation of the blood in the veins and capillaries and that will also press onward the flow of the lymphatic fluids, thus allowing new arterial blood to enter the tissues and give them nutrition and restoration. The machine is intended to be held in the hand, pressed against the surface to be treated, and pushed in the direction of the venous current and may be used by the person to be massaged or may be applied by an attendant. It may be applied to the legs, arms, face, scalp, or other parts of the body, as desired. The motive power is preferably secured through the medium of a flexible shaft which will admit of the machine being used in any position, the motion coming from an electric motor or other convenient source of power.

In the accompanying drawings, Figure 1 represents a central longitudinal section and partial elevation of one form or modification of my invention. Fig. 2 represents a section on the line 2 2 of Fig. 1. Fig. 3 represents a top plan view of the crank-disk constituting one of the elements thereof. Fig. 4 represents a perspective view of said modification. Fig. 5 represents in side elevation and plan view one of the massaging pads or thumbs. Figs. 6 and 7 represent, respectively, perspective views of additional modifications. Fig. 8 represents a partial sectional elevation of Fig. 7. Fig. 9 represents a perspective view of a further modification of the invention, and Fig. 10 represents a partial sectional elevation thereof.

Similar numerals of reference indicate similar parts throughout the several views.

In all the embodiments of my invention as they have been illustrated in the drawings and as they will be hereinafter more fully described the purpose has been to provide a mechanism which will impart to levers acting in pairs and provided with padded thumb-like ends rapidly-acting compressing and relaxing movements, so that when the massaging-pads are applied to various parts of the body the tissues shall receive a succession of short compressions or blows so directed or exerted as to force the venous blood to flow onward toward the heart.

In the first form or modification of the invention, as illustrated in Figs. 1 to 4, the soft tissues of the part to which it is applied are alternately compressed and relaxed in quick succession by four padded thumbs of relatively large size, which act in pairs and which are so mechanically contrived that while one pair of the thumb-like pads is compressing the tissues of a part from opposite directions the other pair of thumbs at right angles to the former is relaxing its hold and is taking position for another grip.

Referring to Figs. 1 to 5 of the drawings, the mechanism by which these movements are secured in the first form or modification of the invention consists, primarily, of the revoluble shaft 1, which is adapted to be coupled to the flexible shaft 2, as shown, connecting it with the source of power. A crank-disk 3 on the free end of the shaft 1 is provided with a series of holes (see Fig. 3) admitting corresponding adjustments of the wrist-pin 4, so as to vary the throw of the pitman 5, which connects said wrist-pin with the plunger or piston 6, whose reciprocations actuate the massaging pads or thumbs. The shaft 1 has its bearings within a sleeve 8, surrounded by a handle 9, of wood or the like. To the upper screw-threaded end of the sleeve 8 is secured a casting 10, which may conveniently be provided with a projection for the attachment of another handle 11, so that either or both handles may be employed, as desired, according to the particular requirements of use. The casting 10 is hollowed out to form a housing for the crank-disk and pitman, said housing being accessible through the sliding cover 12, pivoted to the casting by the pin 13. The casting is also provided with a lateral extension 14, containing one of the bearings of the piston 6, and which is provided with a flange, as shown, for the attachment of the casing 15, containing the other bearing for said piston. Spaced at equal distances from each other about the piston 6 are the levers 16, pivoted to swing upon transverse pivot-pins spanning the slots 17 and passing through longitudinal slots in the casing 15. At their free ends (see Fig. 5) these levers are bent outwardly and are attached to the pads 18. The pads are also preferably covered (see, for instance, Figs. 1 to 4) with a supplemental elastic glove or jacket 19, of soft rubber, which may be replaced by another when for sanitary reasons it is desirable to do so. The levers 16, and consequently the massaging pads or thumbs, are thus arranged in pairs in planes transverse to each other. The members of each pair are designed to approach each other during a corresponding mutual receding movement of the members of the other pair. This purpose is effected by connecting each pair with the piston 6 through the intermediacy of a pair of toggle-levers 20 and 21, respectively, said pairs of toggle-levers being themselves located in planes transverse to each other and being oppositely inclined with relation to the plunger or piston, as indicated more fully in Fig. 1. The toggle-levers are attached to lugs upon the piston 6 and the levers 16, respectively, and are so placed that when the piston is at the extreme forward limit of its throw the rear pair of levers shall assume a position substantially at right angles to the piston, whereas when the piston is at the extreme rearward limit of its throw, the forward toggles assume a like right-angle position with respect to the piston. As either pair of toggles approaches the right-angle position the other pair approaches correspondingly its angle of least amplitude. It will be apparent, therefore, that each reciprocation of the piston gives to the two pairs of levers and their thumb-like padded ends a compressing movement and relaxing movement, alternating with each other. The purpose of so arranging these levers with their compressing thumb-like pads in two pairs is not only that they thus exercise double the manipulating effect of one pair, but also that they provide a peculiar feature of safety in manipulating smaller parts, such as the arms or the arms and legs of smaller persons. Inasmuch as one pair of the padded lever ends stands at right angles to the other pair, neither pair can be placed upon a small limb or other part at right angles to the length of the limb or in such a manner as would permit the muscular tissues to be injuriously pinched or squeezed. Yet another valuable function of this arrangement of four padded thumbs acting in pairs alternately is that it is necessary in applying the compressing-pads to long muscles (for instance, muscles of the arms or legs) to so place them that they act obliquely with respect to the direction of the muscular fibers, and hence while they cannot pinch the muscle injuriously they do slightly twist or distort it from its straight line, and this action is reversed in quick succession, so that they thus most effectively press onward the venous and capillary circulations. This first form or modification of the machine is especially adapted for manipulating parts of the face, the scalp, and small limbs or the smaller parts of large limbs. In this form or modification, as well as in other forms or modifications wherein I employ a reciprocating piston with links attached to this piston and to the moving levers, I may vary the throw of the piston, and consequently the amplitude of swing of the lever-pads, by shifting the position of the wrist-pin 4 in the crank-disk 3 of the revolving shaft, thereby giving the pitman and the piston a shorter or a longer stroke. I may also secure a like adjustment of throw or a variety of expansion positions of the levers and their thumbs by using links of different lengths or levers of different forms.

In Fig. 6 I have illustrated a modification wherein the alternate compression and release of the tissues is effected through the instrumentality of but two pads 22, mounted upon levers 23, operating in slots 24 of the stationary frame 25, said levers being connected by the toggle-levers 26 to the reciprocating piston or plunger 27, which receives its movement from the pitman 28 and the crank 29 of the rotary shaft 1. So, also, in the construction shown in Figs. 7 and 8 a like movement of the pads 29 and levers 30 is obtained through the instrumentality of the eccentrics 31 and eccentric-straps 32, connected to said levers and actuated by the shaft 1. The forms or modifications carrying this single pair of broader pads is especially designed for use upon the legs and the larger parts of the arms and, in general, upon various parts of the body where a larger grasp is needed. Moreover, in these instances I prefer to make the spring metal of the levers heavier and to so arrange each of the broad pads that it will stand at a slight angle with the line of the limb to which the pads are to be applied. This angle should be somewhat greater than would make the two pads fit the natural taper of the limb, the purpose being to so arrange that in compressing the tissues the pad-margins acting farthest down the limb will compress first and more firmly than those parts acting above, thereby more effectively urging the venous blood toward the heart.

In Figs. 9 and 10 I illustrate another form or modification of the machine, likewise designed to operate upon the larger parts of the body. The rotatory shaft 1 in this machine is provided with a series of eccentrics 33, connected by eccentric-straps 34 to the swinging levers 35, said levers bearing at their free ends the pads 36 and being pivoted at their opposite ends to bracket-lugs 37, projecting from the casing 38. It will be particularly noted that the levers 35 are of successively-increasing length from the lower pair to the upper pair of the series, whereas the points of attachment of the toggles thereto are in the same vertical plane. The effect of this disposition of parts is to give a decidedly increased range of movement to the lowest pair of pads, which are designed to act upon the lowermost part of the region to which the machine is for the moment being applied, and to give a graduated decreasing range of movement to the successive upper pairs of pads. It is apparent that this same result may be attained by other relative adjustments of the moving parts.

While the details of the various forms or modifications of my invention differ, it will be observed that they all possess the main distinguishing characteristic that they secure by mechanical contrivances a succession of rapidly compressing and relaxing movements, serving as short quick blows to the tissues, so directed that their tendency will be to drive or push the blood in the venous system onward toward the heart, together with the lymphatic fluids of the part acted upon, thus promoting the more active circulation of new arterial blood in the parts so manipulated. So far as I am aware a machine effecting this result is new in the art, and I desire, therefore, that my broad claims be given a corresponding interpretation commensurate with this generic feature of novelty.

In designing the thumb-like pads, and in the larger machine the larger finger-like pads, I have aimed to use such shapes or contours of the applying surfaces as will best fit the various parts of the body to which the machine is adapted and have arranged these pads upon springy levers, so that they will still better apply themselves when pressed upon the tissues. In constructing these padded appliances I have adopted cork of considerable thickness as the most resilient substance and as less liable to bruise the body than rubber, the rubber covering being stretched over the cork for cleanliness; but in order to insure absolute cleanliness in its use I recommend that separate sets of thumb stalls or coverings be provided, made of rubber or of chamois, and that these be substituted whenever a new patient shall make use of the machine.

Having thus described my invention, what I claim, and desire to secure by Letters Patent, is—

1. A massage-machine, comprising oppositely-disposed massage-pads, and mechanism for causing said pads to move toward and from each other; substantially as described.

2. A massage-machine, comprising oppositely-disposed massage-pads, pivoted arms upon which said pads are mounted, and mechanism intermediate of the arms to cause them to move toward and from each other; substantially as described.

3. A massage-machine, comprising oppositely-disposed massage-pads, pivoted arms upon which said pads are mounted, and a mechanism intermediate of the arms and connected thereto by means of links to cause them to move toward and from each other; substantially as described.

4. A massage-machine, comprising oppositely-disposed massage-pads, pivoted arms upon which said pads are mounted, and a mechanism intermediate of the arms and connected thereto by means of links at points between the pads and the pivotal centers of the arms so as to cause them to move toward and from each other; substantially as described.

5. A massage-machine, comprising oppositely-disposed massage-pads, pivoted arms upon which said pads are so mounted as to incline rearwardly from a vertical plane, and mechanism for causing the pads and arms to move toward and from each other; substantially as described.

6. A massage-machine, comprising oppositely-disposed massage-pads, mechanism for causing said pads to move toward and from each other, a portable housing for said mechanism, and a handle or handles for manipulating the machine and graduating the pressure to be applied to the surface treated, substantially as described.

7. A massage-machine, comprising oppositely-disposed massage-pads, a rotatory shaft having a coupling for attachment to and detachment from a flexible shaft, a handle within which said shaft is journaled, and connections intermediate of the shaft and pads for causing the latter to move toward and from each other; substantially as described.

8. A massage-machine, comprising a plurality of pairs of oppositely-disposed massage-pads, and mechanism for causing the pads of each pair to move toward and from each other; substantially as described.

9. A massage-machine, comprising a plurality of pairs of oppositely-disposed massage-pads, and mechanism for causing the pads of one pair to move toward each other, while causing the pads of the other pair to move from each other; substantially as described.

10. A massage-machine, comprising a plurality of pairs of oppositely-disposed massage-pads, and mechanism for causing the pads of one pair to move toward each other, while causing the pads of the other pair to move from each other, said mechanism comprising a reciprocating plunger and intermediate pairs of connecting-links inclined in opposite directions with respect to the plunger; substantially as described.

11. A massage-machine, comprising oppositely-disposed massage-pads, a reciprocating plunger, and toggle-links for transmitting a contracting and expanding motion to said pads; substantially as described.

In testimony whereof I affix my signature in presence of two witnesses.

THOMAS D. INGRAM.

Witnesses:
EDWIN S. CLARKSON,
CHAS. J. O'NEILL.